United States Patent Office 3,190,870
Patented June 22, 1965

3,190,870
METHOD OF PREPARING COLORED MODIFIED CLAY
Ira D. Elkins, Cushing, Okla., assignor to Kerr-McGee Oil Industries, Inc., a corporation of Delaware
No Drawing. Filed June 29, 1960, Ser. No. 39,720
6 Claims. (Cl. 260—144)

This invention broadly relates to novel colored modified clays and, in some of its more specific aspects, to reinforced rubber compositions containing such colored modified clays and to a process for their preparation.

Colorless modified clays are well-known to the art, but heretofore an entirely satisfactory colored modified clay has not been available. For some time colored compositions have been produced using the modified clays presently available by mechanically incorporating dyes and pigments therewith, but they were not satisfactory due, among other reasons, to instability and a tendency of the dye to bleed or migrate.

In accordance with one embodiment of the present invention, an organic modified clay is provided which may be intensely colored. This is accomplished by replacing the inorganic cation orginally present on a clay exhibiting a base-exchange capacity with a substituted organic cation selected from the group consisting of $RNH_3^+$, $R_2NH_2^+$, $R_3NH^+$ and $R_4N^+$. The radical R in the foregoing cations may contain a chromophoric group or it may contain a group which may be readily converted into a chromophoric group. The resultant colored modified clay is colorfast and does not have the disadvantages of the above-mentioned mechanical mixtures of the prior art.

The colored modified clays of the invention differ markedly from the colored adsorption adducts of aniline and its analogues with clay. For example, colored clay-aniline adsorption mixtures or adducts are characterized by a bond between the aniline and clay which is very weak and unstable. Also, the color in the clay-aniline adducts of the prior art generally is observed only when water is present and, further, the color is leached out by acetone to give the original colorless modified clay. The colored modified clays of the present invention are stable, not leachable by acetone, and have a very strong bond between the organic radical and the clay.

It is an object of the present invention to provide a novel colored modified clay.

It is a further object of the present invention to provide a process for preparing the novel colored modified clay of the invention.

It is a further object of the present invention to provide colored reinforced rubber compositions including the novel colored modified clay of the invention.

It is still a further object of the invention to provide a colored reinforced rubber including the novel colored modified clay of the invention, and a process for preparing such reinforced rubbers.

Still other objects of the present invention and the attendant advantages will be apparent to those skilled in the art upon reference to the following detailed description and the specific examples.

In accordance with one embodiment of the present invention, colored modified clays originally exhibiting a base-exchange capacity in which the inorganic cation has been replaced by a substituted organic cation selected from the group consisting of $RNH_3^+$, $R_2NH_2^+$, $R_3NH^+$ and $R_4N^+$, where R is an organic radical containing about 3–18 carbon atoms and at least one effective chromophoric group are produced by process to be more fully discussed below.

One process for preparing the colored modified clays of the invention involves reacting an organic amine salt with the acidic reactive centers of a clay exhibiting a base-exchange capacity to replace the inorganic cation with the organic cation of the amine salt. Since the resulting bond between the clay and the organic cation is extremely strong, there is no tendency for the organic cation to be detached upon leaching with water or simple organic reagents such as acetone. The bond between the clay and the organic cation is non-chromophoric in nature and thus it is necessary to provide an effective chromophoric group in the organic radical. In has been discovered that this may be accomplished by using an amine for the reaction which already contains an effective chromophoric group in the organic radical, or the effective chromophoric group may be introduced into the organic radical after the amine salt and clay have reacted. For example, an amine having an organic radical containing an effective chromophoric group such as nitro, nitroso, azo, azoxy, diketo, or a conjugated double bond system, may be neutralized with a mineral acid such as hydrochloric acid or sulfuric acid, or an organic acid such as acetic acid to form the amine salt. Then, the amine salt is reacted with clay exhibiting a base exchange capacity to give a colored organic modified clay which is hydrophobic in nature. Alternatively, the chromophoric group may be introduced into colorless organic modified clay. In such instances, an amine salt having an organic radical containing a group which may be readily converted into an effective chromophoric group is reacted with the clay, and subsequent thereto the effective chromophoric group is introduced.

The amines which may be reacted with clays exhibiting a base-exchange capacity to form colored modified clays are of the formulae $RNH_3X$, $R_2NH_2X$, $R_3NHX$ and $R_4NX$, where R is an organic radical containing about 3 to 18 carbon atoms and X is an acid radical which ionizes readily, such as chloride, sulphate, and acetate. The organic radical may be alkyl, aryl, aryl-alkyl, etc. Chloride and acetate are preferred acid radicals. When the above amines are used to prepare colored organic modified clays directly, the nature of R is further qualified, and the organic radical must contain at least one effective chromophoric group. Otherwise, the organic radical must be reactive with a suitable intermediate to induce or form a chromophoric group without disrupting the organic radical-clay bonds. Examples of organic radicals which may be readily coupled with an intermediate to form a chromophoric group are derived from phenols, naphthols, or organic amines. For example, when the organic radical contains a phenolic group or amine group, the resulting modified clay may be readily converted to a colored azo-type modified clay, and when the organic radical contains an aromatic aldehyde or aromatic phenol-aldehyde group, it may be reacted with a suitable intermediate such as dimethyl aniline to form a triphenyl methane-type dye. In instances where the organic radical contains an effective chromophoric group and thus the modified clay is colored as produced, such as chromophoric group may be nitro, nitroso, azo, azoxy, diketo, a conjugated double bond, or other well-known chromophoric groups.

The clays which are useful as starting materials to provide the colored modified clays of the invention are those exhibiting substantial base-exchange properties and containing inorganic cations capable of replacement by the above-mentioned organic bases. Examples of such clays include montmorillonite, such as sodium, potassium, lithium and other bentonites, particularly of the Wyoming type; magnesium bentonite, sometimes called hectorite, saponite, nontronite, attapulgite, particularly that of the Georgia-Florida type, and halloysite. Such clays are characterized by an unbalanced crystal lattice and are believed to have negative charges which are normally neutralized by inorganic cations. As found in nature, they exist as salts of the weak clay-acid with bases such as the alkali, or alkaline-earth metal hydroxides. The swelling bentonites of the Wyoming type and the swelling magnesium bentonites of the hectorite type are particularly useful in practicing the present invention.

The above base exchange reaction is thought to proceed by displacement of the naturally present inorganic cations of the clay by the organic cations of the amine salt, as follows:

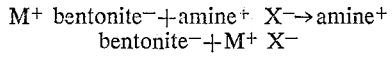

where M+ is a replaceable inorganic cation such as the alkali and alkaline earth metals or hydrogen, and X− is the anion of the amine salt such as chloride or acetate.

The base-exchange capacities of the various clays mentioned above may vary from a low of about 10 to a high of about 100 milliequivalents of exchangeable base per 100 grams of clay. Generally speaking, clays having a high base exchange capacity are more useful in the present invention than clays exhibiting a low base exchange capacity. Montmorillonites, attapulgite and halloysite have base exchange capacities of 60–100, 25–35, and 6–15, respectively. Other clays which have weak ion exchange properties such as kaolin of the non-montmorillonite type, also may be employed, but it is preferred that the clay be activated by grinding to increase the number of reactive centers and/or expose more of the reactive centers to the amine salt. Also, synthetic clays such as the hydrated calcium silicates known to the trade as "Silene EF," as well as hydrated silicas may be used in practicing the invention and are referred to herein as clays. The essential characteristic of these siliceous substances is that they be capable of binding an organic amine cation to their surfaces.

In reacting the amine salt with the clay, a solution is prepared and then agitated with a slurry of the clay for a period of time sufficient to replace the inorganic cations with the organic cation of the amine salt. This reaction may be followed by observing the nature of the clay. At the time of commencing the reaction, an aqueous solution of the amine salt will be found to wet the clay. Then, as the reaction proceeds, the surface characteristics of the clay are modified to such an extent by reaction and replacement of the inorganic cations with the organic amine cations that the resultant modified clay becomes hydrophobic in nature and organophilic. Usually, when the clay exhibits substantial organophilic properties and is hydrophobic in nature, then sufficient organic amine cations have been added to the clay to be effective in practicing the present invention and the reaction may be terminated. However, further reaction may be desired in order to give deeper colors.

The colored modified clays of the present invention may be used as pigments in paints and they are especially useful in paints of the type used for marking the center lines of streets. The modified clays of the invention are also useful in preparing colored reinforced rubber.

When using the colored modified clays of the invention for preparing colored reinforced rubbers, all compounding steps may be as conventionally practiced in the preparation of reinforced rubber from uncolored modified clay. However, it is preferred that the rubber be compounded following conventional procedure with the exception of compounding the rubber and the clay, among other conventional ingredients, in the presence of a non-staining rubbery polymer-compatible hydrocarbon. The hydrocarbon may be any suitable rubbery polymer processing oil of the prior art, such as that sold under the trade name "Circosol 2XH," a light lubricating oil fully described in "Rubber Age," volume 70, No. 6, pages 735–747 (March 1952). Other hydrocarbons which may used are pine oil, light lubricating oil, petroleum, naphtha, etc. This procedure has been found to improve the brightness of the resultant product remarkably and especially following a subsequent vulcanizing step.

Examples of rubbers which may be compounded with the colored modified clays of the invention are rubbery homopolymers of conjugated diolefins and rubbery copolymers of conjugated diolefins and ethylenically unsaturated monomers such as natural rubber, polybutadiene, polychloroprene, polyisoprene, copolymers of butadiene and styrene, coplymers of butadiene and acrylonitrile, copolymers of isobutene and isoprene, and copolymers of isobutene and butadiene. Mixtures of the foregoing rubbers also may be used.

The following specific examples are for the purpose of illustration only and are not intended as being limiting to the appended claims.

*Example I*

Aniline was neutralized with hydrochloric acid to form aniline hydrochloride and then 15 grams of the aniline hydrochloride in 100 cc. of water was stirred into a slurry containing 25 grams of bentonite. As the reaction progressed, the bentonite no longer was water wettable. The aniline modified clay was filtered from the water slurry as a colorless filter cake.

The filter cake was slurried with a solution containing sulfanilic acid (20 grams) and diazotized at 0–10° C. with a mixture of hydrochloric acid and sodium nitrite. As the slurry warmed up, the diazotized sulfanilic acid coupled with the aniline of the clay to give a modified clay having a deep red color. The mixture was filtered and washed to obtain a deep red powdery hydrophobic powder. Acetone did not destroy the color nor extract colored material from the clay.

*Example II*

Aniline (50 grams) was treated at 0–10° C. with 25 gm. of diazotized aniline in 100 cc. of water. The reaction product was maintained at 50° C. under weakly acid conditions to effect the rearrangement of the diazoaminobenzene to give p-amino-azobenzene. The resulting p-amino-azobenzene mixture was extracted with alcohol to free it of excess aniline.

The p-amino-azobenzene was neutralized with hydrochloric and then slowly added to a slurry of bentonite. The suspension of clay became hydrophobic and was filtered to obtain a modified bentonite having a yellow color. This yellow product was stable when free of water and, in the presence of acetone, the color was not extracted from the clay.

*Example III*

Ortho-(di-methyl amino)methyl phenol (5 grams) was neutralized with sulfuric acid to the methyl orange end point. The neutralized amine was diluted with two liters of distilled water and then bentonite (50 grams) was slowly stirred into the amine solution to give a slurry. The slurry was agitated for about 20 minutes and filtered. The filter cake was washed with fresh neutralized amine solution and water washed. The dry filter cake was a colorless hydrophobic powdery substance.

The colorless modified clay was suspended in a dilute sodium bicarbonate solution and 400 cc. of benzene diazonium chloride solution was added to the suspension. Upon the addition of the diazonium chloride solution an orange color developed instantaneously to give an orange colored organic modified hydrophobic bentonite. Solubility tests indicated the color was an integral part of the organic modified bentonite and not merely dye adsorbed on the bentonite surface. The modified bentonite filter cake was found to be non-water-swellable and acetone did not destroy or extract the color. Also, the color persisted when the filter cake was dried to remove the last traces of moisture.

*Example IV*

β-Naphthylamine (200 grams) was converted to β-naphthalene diazonium chloride with sodium nitrite and hydrochloric acid, and the resultant β-naphthalene diazonium chloride was added to an alkaline solution of ortho- (dimethyl amino)methyl phenol. The appearance of color indicated that a coupling reaction was occurring. The reaction product was suspended in 20 liters of dilute sulfuric acid solution and bentonite (5000 grams) was stirred into the suspension of the diazo product. The bentonite became non-water wettable and flocculated. The resulting mixture was filtered to obtain a chocolate brown modified bentonite.

*Example V*

To illustrate the preparation of a colored organic modified clay containing the triphenyl methane type chromophoric group, p-amino-benzaldehyde (5 grams) is neutralized with hydrochloric acid. The neutralized amine is poured slowly into a suspension of bentonite (15 grams), the suspension filtered, and the filter cake washed with dilute hydrochloric acid.

The washed filter cake is suspended in a dilute zinc chloride solution, dimethylaniline (10 grams) added to the suspension, and the resulting suspension warmed and agitated for about an hour. Since the resulting chromophoric group is in the reduced form, the modified clay is colorless. Upon addition of an oxidizing agent such as lead dioxide, the chromophoric group becomes effective and the modified clay takes on a greenish color.

*Example VI*

Ten grams of 1-(2-aminoethyl)-4-benzyl benzene was neutralized with hydrochloric acid and poured slowly into a suspension of bentonite (10 grams) in 100 ml. of distilled water. After three hours of agitation, the suspension was filtered and the filter cake was washed with dilute HCl.

The washed filter cake was suspended in dilute zinc chloride solution and dimethylaniline (20 grams) added to the suspension. The suspension was maintained by agitation and the mixture was warmed to facilitate the coupling reaction to produce the triphenyl chromophoric group.

*Example VII*

Bis(4-dimethylaminophenyl) 4-(2-aminoethyl)phenyl methane was neutralized with dilute hydrochloric acid and slowly added to a water slurry of kaolin. The slurry became hydrophobic indicating the triphenyl methane dye had reacted with the clay.

Bis(4-aminophenyl) 4-(2-aminoethyl)phenyl methane reacted in a similar manner with the clays.

*Example VIII*

Colored reinforced rubber compositions may be prepared from the colored modified clay of Example I as follows, with all parts being by weight unless otherwise noted:

| | Parts |
|---|---|
| GR-S synthetic rubber (41° F.) | 100 |
| Zinc oxide | 3 |
| Sulfur | 1.75 |
| Stearic acid | 1 |
| Flexamine | 1 |
| Circo-para | 5 |
| Santocure (N-cyclohexyl-2-benzothiazole sulfenamide) | 2.6 |
| Two parts of the modified clay of Example I in one part of naphtha, with the clay and naphtha being in the form of a paste | 150 |

The above ingredients are milled in accordance with conventional rubber compounding techniques and cured at 307° F. for a period of thirty minutes. The resulting rubber has a bright red color and the color is very stable.

When the above ingredients were compounded with the naphtha being omitted from the colored modified clay and the colored modified clay added in the form of a dry powder, the compounding otherwise carried out as above, then the color of the rubber product was not as brilliant. However, the resultant colored reinforced rubber was satisfactory for general commercial use where color is desired and brilliance of color is not essential.

What is claimed is:

1. A method of preparing a colored modified clay comprising the steps of reacting an aqueous solution of a salt of an organic amine with clay exhibiting a base exchange capacity to replace inorganic cations of the clay with organic amine cations of the said salt and produce a modified clay, and thereafter reacting the said organic amine cations of the modified clay with a dye-forming component reactive therewith to produce a dye-modified clay, said dye being selected from the group consisting of azo dyes and triphenyl methane dyes.

2. The process of claim 1 wherein the clay is bentonite.

3. A method of preparing a colored modified clay which comprises the steps of reacting a clay originally exhibiting a base exchange capacity with an aqueous solution of aniline hydrochloride to produce a modified clay, and thereafter reacting the modified clay with a solution containing diazotized sulfanilic acid to produce a colored azo dye modified clay.

4. A method of preparing a colored modified clay comprising reacting an aqueous solution of an ortho-(dimethyl amino) methyl phenol salt with a clay originally exhibiting a base exchange capacity to produce a modified clay in which inorganic cations originally present have been replaced by cations of the said salt, and thereafter reacting the resulting modified clay with benzene diazonium chloride to produce a colored azo dye modified clay.

5. A method of preparing a colored modified clay comprising reacting an aqueous solution of a p-aminobenzaldehyde salt with clay originally exhibiting a base exchange capacity to produce a modified clay in which inorganic cations originally present have been replaced by cations of the said salt, and thereafter reacting the resulting modified clay with dimethylaniline in a dilute solution of zinc chloride to produce a colored triphenyl methane dye modified clay.

6. A method of preparing a colored modified clay comprising reacting an aqueous solution of 1-(2-aminoethyl)-4-benzyl benzene hydrochloride with clay originally exhibiting a base exchange capacity to produce a modified clay in which the inorganic cations of the clay have been replaced by organic amine cations and thereafter reacting the said modified clay with dimethylaniline in aqueous zinc chloride solution to produce a colored triphenyl methane dye modified clay.

References Cited by the Examiner

UNITED STATES PATENTS

| | | | |
|---|---|---|---|
| 1,886,480 | 11/32 | Haller et al. | 260—153 |
| 2,033,856 | 3/36 | Smith | 260—287 |
| 2,188,889 | 1/40 | Clocker | 260—414 |
| 2,425,286 | 8/47 | Thurston et al. | 260—153 |
| 2,428,108 | 9/47 | McQueen | 260—310 |
| 2,478,768 | 8/49 | Locke | 260—144 |
| 2,531,396 | 11/50 | Carter | 260—41.5 |
| 2,645,636 | 7/53 | Sogn | 260—143 |
| 2,697,699 | 12/54 | Cohn | 260—41.5 |
| 2,886,550 | 5/59 | Goren | 260—33.6 |

OTHER REFERENCES

Chem. Abstracts, vol. 53 (1959), page 5038 (citing Issledovanie i Isopol'zovanie Glin, L'vo, Gosudarst, Univ. im. I. Franko, Materialy Soveshchaniya L'ov, 1957, pages 795–801).

"Color Index," 2nd ed., vol. 3, page 3038 (1956)

CHARLES B. PARKER, *Primary Examiner*.

L. J. BERCOVITZ, L. ZITVER, *Examiners*.